United States Patent [19]

Stauers

[11] 4,282,408
[45] Aug. 4, 1981

[54] ON-HOOK/OFF-HOOK DETECTOR CIRCUIT

[75] Inventor: Olgerts Stauers, Lakewood, Colo.

[73] Assignee: Western Electric Company, Inc., New York, N.Y.

[21] Appl. No.: 88,219

[22] Filed: Oct. 25, 1979

[51] Int. Cl.³ .......................... H04M 3/22; H04B 3/00
[52] U.S. Cl. ................................................ 179/18 FA
[58] Field of Search ............. 179/18 FA, 84 R, 84 L, 179/16 R, 16 A, 16 AA, 16 E, 16 F, 18 F, 81 R, 81 L

[56] References Cited

U.S. PATENT DOCUMENTS

| | | | |
|---|---|---|---|
| 3,410,961 | 11/1968 | Slana | 179/18 FA |
| 3,819,866 | 6/1974 | Hawley | 179/18 FA |

FOREIGN PATENT DOCUMENTS

2397108  3/1979  France ................. 179/18 FA

OTHER PUBLICATIONS

Glowienka et al., "Telephone On/Off Hook Detector", IBM Tech. Dis. Bull., vol. 16, No. 5, Oct. 1973, pp. 1558–1559.

*Primary Examiner*—Thomas A. Robinson
*Attorney, Agent, or Firm*—J. J. Jordan; J. L. Landis

[57] ABSTRACT

An on-hook/off-hook detection circuit comprises a light-emitting device 54 connected across the tip T and ring R leads of a subscriber's telephone set 50 and between current source 56 and ground 57. A photo-transistor 60 is optically coupled to the light-emitting device 54 for signaling a line scanner 53. When the subscriber's telephone set 50 goes off-hook, a short circuit comprising tip T, telephone set 50 and ring lead R causes light-emitting device 54 to become non-conducting while the light-emitting device 54 is conducting when subscriber's telephone set 50 is on-hook.

4 Claims, 3 Drawing Figures

TELEPHONE SWITCHING SYSTEM

ON-HOOK/OFF-HOOK DETECTOR CIRCUIT

TECHNICAL FIELD

This application relates generally to on-hook/off-hook detection circuits and in particular to detection circuits using photon coupling.

BACKGROUND OF THE INVENTION

In a telephone system it is required that the on-hook/off-hook status of subscriber telephone sets associated with the system be constantly monitored so that the system can properly respond, i.e., return dial tone, end ringing, or receive dial pulses, as quickly as possible after the subscriber lifts the telephone handset to initiate a call, or answer ringing or after the subscriber terminates a call by replacing the handset. In order to be able to determine the status of subscriber lines, a detection circuit is associated with each line and in the past many different types of circuits employing different devices, including photon or optical coupling, have been used. Typically, in an optical detection circuit, a photon-emitting device is connected in each of the tip and ring leads associated with the subscriber's telephone set. The photon-emitting devices, usually light-emitting diodes, are each light coupled to a photo-receiving device which are directly connected in a line scanning circuit forming part of the common control equipment of the telephone switching system. When the subscriber goes off-hook, the light-emitting diodes in the tip and ring leads become conductive, emit light which triggers the light coupled receiving devices in the scanning circuit thereby signaling the control equipment that the subscriber has gone off-hook. Similarly, the light coupled devices indicate when the subscriber has gone on-hook.

Although this type of light coupled circuit operates satisfactorily in most telephone switching systems, it does present problems in systems such as Private Branch Exchange (PBX) and key telephone systems where the detection circuit and common control equipment are located on the subscriber's premises, and the permissible system size becomes a critical issue. Since the prior art detection circuit associated with each subscriber line requires at least four light coupled devices, one light-emitting device in each of the tip and ring leads, and corresponding light-receiving devices, any reduction in the number of devices required for each line would result in savings of equipment mounting space and material cost.

Furthermore, optically connected devices which are connected in the tip and ring leads of a subscriber's line often present electrical balancing and transmission problems which must be overcome in order to provide satisfactory telephone service over the line.

SUMMARY OF THE INVENTION

A general object of this invention is to provide a simple on-hook/off-hook detection circuit that can be used to minimize the number of optical devices presently used. Some advantages of the invention relate to: (a) reduction in the amount of space required for each detection circuit associated with a subscriber line; (b) ease in manufacturing due to a fewer number of devices employed; (c) reduction in electrical balancing problems on the subscriber's line; and (d) lower cost per circuit.

A specific object of the invention is to provide an on-hook/off-hook detection circuit which uses only a single photon, or light, emitting device and a single photon, or light, receiving device per circuit.

Another specific object of the invention is to provide a detection circuit employing optical coupling wherein no optical device is connected in series with the subscriber's line thereby reducing electrical balancing problems.

With the foregoing and other objects in view, an on-hook/off-hook detection circuit for use with a subscriber's telephone set, in accordance with certain features of the invention, utilizes a light-emitting device connected in parallel with the telephone set, the parallel arrangement of light-emitting device and telephone set being connected in series with a current source such that when the telephone set is on-hook the device emits light and when it is off-hook the device does not emit light. A light-responsive device, optically coupled to the light-emitting device, is interconnected with line scanning equipment in a telephone system.

Other objects, advantages and features of the invention will be apparent from the following detailed description of a specific embodiment thereof, when read in conjunction with the accompanying drawings.

DETAILED DESCRIPTION

Figure 1:
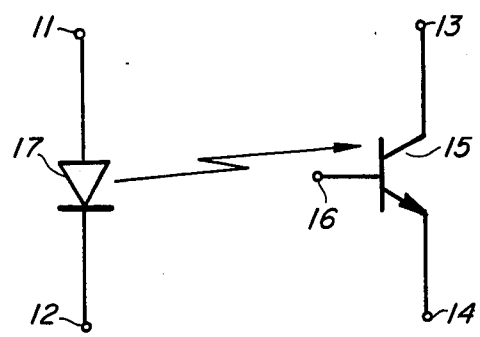
FIG. 1 is a schematic drawing of photon-coupled devices.

In the photon-coupled circuit of FIG. 1 in the absence of a current between terminals 11 and 12 no current can flow between terminals 13 and 14 unless phototransistor 15 is forward biased with the application of a potential to terminal 16 which is greater in magnitude than the potential appearing at terminal 14. When current flows between terminals 11 and 12 through gallium aluminum arsenide diode 17, the diode emits photons, or light, which impinge on the base region of photo-transistor 15 thereby exciting the photo-transistor into conduction, which occurs even if photo-transistor 15 is not forward biased by an external source. In general, the current flowing between terminals 13 and 14 is dependent upon both the intensity of the photon-stream emitted by diode 17 (which in turn is proportional to the magnitude of the current flowing between terminals 11 and 12), and the externally applied bias at terminal 16 if there is one.

Figure 2:
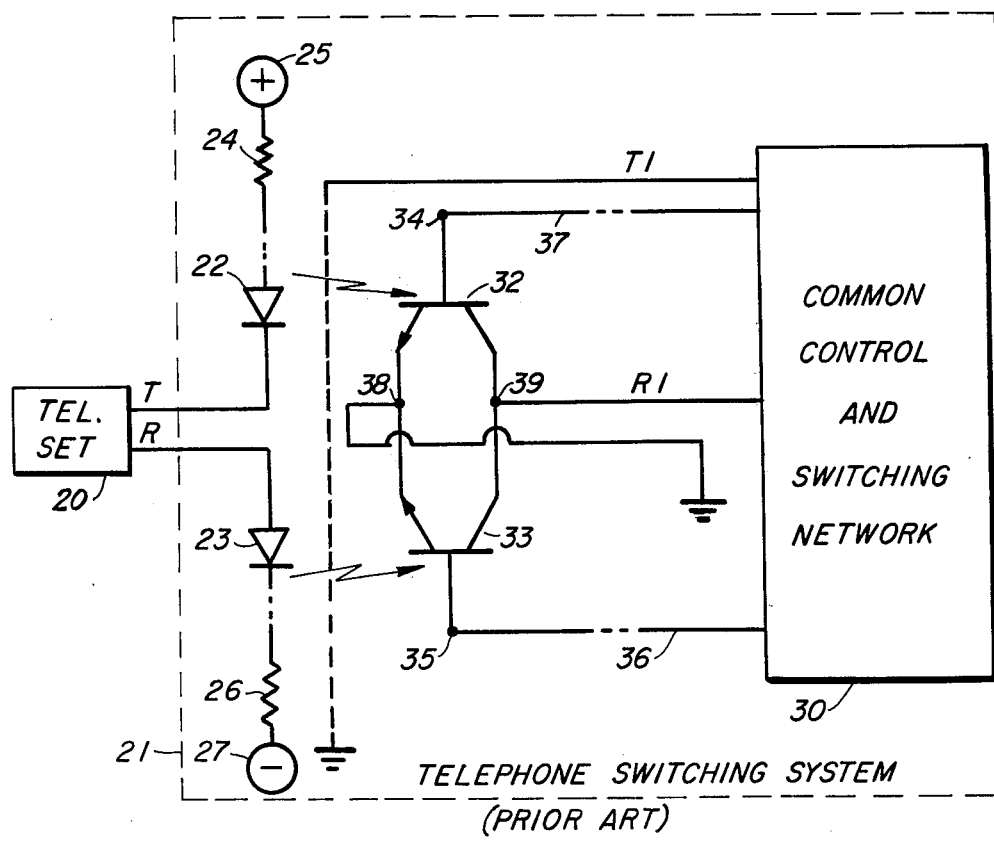
FIG. 2 depicts the connection of a prior art photon-coupled detection circuit.

FIG. 2 shows a typical prior art arrangement using photon-coupled devices in a telephone circuit. A subscriber's telephone set 20 is interconnected with a telephone switching system 21 by tip T and ring R leads. In the telephone switching system 21, the tip T and ring R leads are interconnected with two photon-emitting devices 22–23, one device 22 being connected in the T lead circuit between the telephone set 20 and limiting resistor 24 which is connected with a potential 25, and the other device 23 being connected in the R lead circuit between the telephone set 20 and a limiting resistor 26 which is connected with a negative potential or ground 27. However, in a typical T and R lead circuit arrangement associated with subscriber's telephone 20, photo-transistors and other devices would be included in the T lead circuit between resistor 24 and diode 22, and in the R lead circuit between resistor 26 and diode 23 (shown by dotted lines), for receiving signals, such as voice and ring signals, transmitted from the control and switching network 30 over lead T1. However, these additional devices are not shown herein since an understanding of their operation is not necessary for an understanding of this invention.

In the arrangement shown in FIG. 2 photon-emitting device 22 is optically coupled to photo-transistor 32 while photon-emitting device 23 is optically coupled to photo-transistor 33. The base terminals of transistors 32 and 33 are connected to terminals 34 and 35 which can be connected to other circuitry, or to common control and switching network 30 as shown by dotted lines 37 and 36, respectively, for biasing if required. Typically, however, terminals 34 and 35 are not connected, thus making the conduction through photo-transistors 32 and 33 entirely dependent upon excitation by photons emitted by diodes 22 and 23, respectively.

As long as the subscriber at telephone set 20 remains on-hook, that is, the subscriber is not using the telephone set, no current flows between terminals 25 and 27 and diodes 22 and 23 are not conducting. When the subscriber at telephone set 20 goes off-hook, a closed circuit now exists between terminals 25 and 27, and current flows from source 25, through resistor 24, diode 22, tip conductor T, telephone set 20, ring conductor R, diode 23, resistor 26 to ground 27. Diodes 22 and 23 are now conductive and begin emitting photons which impinge on the base regions of photo-transistors 32 and 33, respectively. As light strikes the photo-transistors 32 and 33 they become conductive and current begins to flow between terminals 38 and 39 which current is fed to the common control and switching network 30 over lead R1. Typically, terminal 39 is interconnected with a scanner circuit in common control and switching network 30 which circuit functions to determine the on-hook/off-hook condition of associated subscribers' telephone lines. When current flows between terminals 38 and 39 and over lead R1, scanner circuitry within common control and switching network 30 is signaled that the subscriber at telephone set 20 is off-hook.

Figure 3:
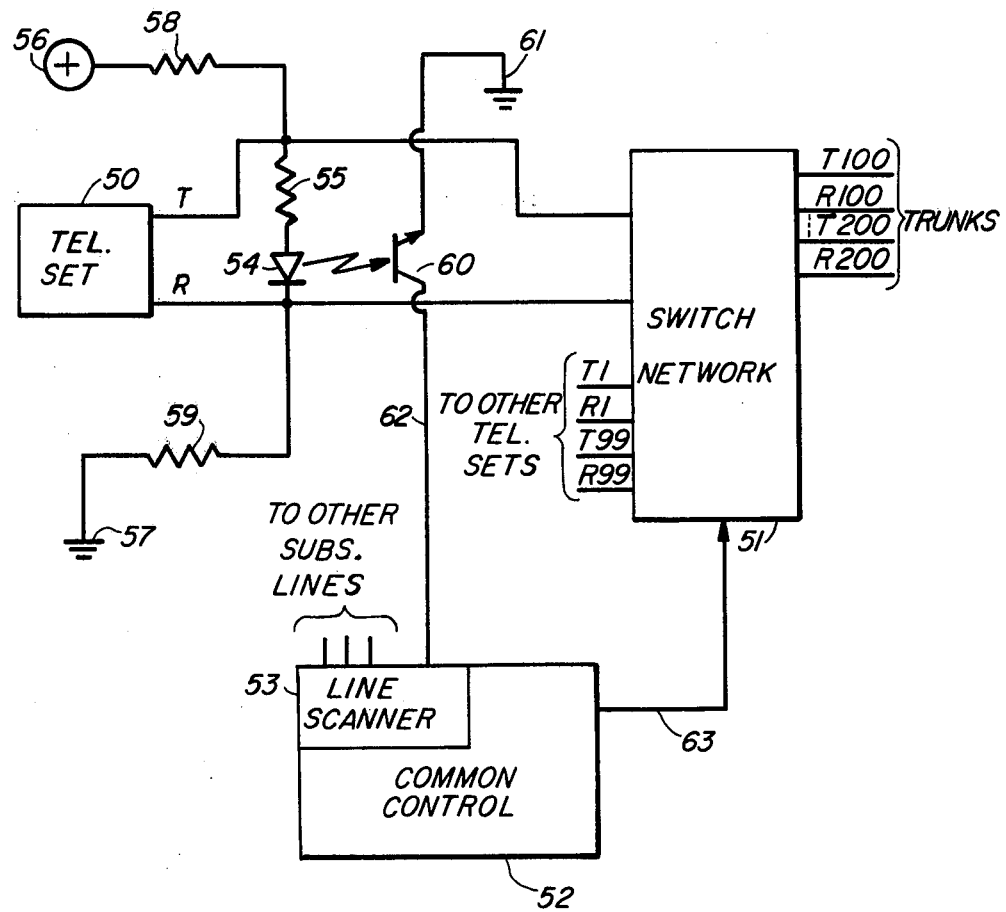
FIG. 3 is an illustrative embodiment of the present invention.

FIG. 3 represents a photon-coupled arrangement utilizing the present invention. Subscriber's telephone set 50 is interconnected with a switching network 51 by tip T and ring R leads which comprise the voice path. Switching network 51 is typically a PBX or key telephone switching arrangement located on the subscriber's premises. Switching network 51, in response to control signals received from common control equipment 52, interconnects the subscriber's telephone set 50 in any well known manner with a particular output or input such as another subscriber telephone set, an outgoing or incoming trunk, signaling sources such as dial tone, busy tone, and ringing generators, or tone receiving equipment. The details of these interconnections are not shown since an understanding of the interconnections is not necessary for an understanding of the present invention.

One of the functions performed by common control equipment 52 is to monitor, or scan, the various telephone lines, that is, the T and R leads associated with subscribers' telephone sets to ascertain whether individual telephone sets are off-hook or on-hook. Typically, common control 52 comprises a line scanner 53 which has as its sole function the monitoring or scanning of the status of each telephone line in the PBX.

Once line scanner 53 detects that a subscriber's line has changed its status, that is, gone off-hook or on-hook, line scanner 53 signals common control 52 of the change and common control 52 reacts accordingly, i.e., signals the switching network 51 to return dial tone or end ringing.

In FIG. 3, line scanner 53 monitors each subscriber telephone set 50 by means of an on-hook/off-hook detection circuit comprising a light-emitting diode 54 in series with a current limiting resistor 55 interconnected across set's tip T and ring R leads in parallel with telephone set 50. Diode 54 is also connected with an external potential 56 and ground 57 through feed-through resistors 58 and 59. Light coupled to diode 54 is photo-transistor 60 which is connected between ground 61 and line scanner 53. Photo-transistor 60 is not forward biased and becomes conductive only when turned on by light emitted from diode 54. A diode-transistor combination manufactured by Western Electric Company, Incorporated and known as the 2B opto-isolator can be used in the circuit shown in FIG. 3 as diode 54 and photo-transistor 60.

During the time that the subscriber at telephone set 50 is on-hook, that is, the telephone set is idle and the subscriber is not using the telephone set, current flows between potential 56 and ground 57 through resistors 55, 58 and 59 and diode 54 which is excited into conduction. Conducting diode 54 emits photons, or light, which impinge on the base region of the photo-transistor 60. Light striking photo-transistor 60 causes it to conduct and current also flows between ground 61 and line scanner 53 through lead 62 thereby signaling common control 52 that the subscriber at telephone set 50 is not using the telephone and is on-hook.

When the subscriber at telephone set 50 goes off-hook to originate or answer a call, the T and R leads are connected together at telephone set 50 by operation of the telephone set. The T and R leads and associated telephone set 50 now present a lower resistance current path between potential 56 and ground 57 than the resistor 55-diode 54 path, thereby electrically shorting out diode 54. Since current flows through the T and R leads and telephone set 50 and not through diodes 54, diode 54 is now turned off and stops emitting photons which in turn causes photo-transistor 60 to become non-conductive. With photo-transistor 60 non-conducting, current no longer flows between ground 61 and line scanner 53 thereby signaling common control 52 that the subscriber at telephone set 50 is off-hook. Common control 52 now signals switching network 51 over lead 63 in any well known manner to return dial tone to the subscriber at telephone set 50 over the associated T and R leads or to stop ringing to that station.

Similarly, when the subscriber at telephone set 50 hangs up the telephone, or goes on-hook after being off-hook, the associated T and R leads become disconnected at telephone set 50 thereby opening the short circuit across light-emitting diode 54. Current now begins to flow through diode 54 causing it to conduct and emit light. The emitted light strikes the base of optically coupled photo-transistor 60 causing it to conduct. Current now flows between ground 61 and line scanner 53 through lead 62 thereby signaling the line scanner that the subscriber at the telephone set 50 has gone on-hook.

Since the current appearing on lead 62 when the subscriber at telephone set 50 is off-hook is different from the current appearing on the lead when the telephone set 50 is on-hook, and since lead 62 is directly connected to line scanner 53, line scanner 53 is notified not only of service requests and hang-ups, but, in addition, can detect dial pulses since each dial pulse causes on-hook and off-hook transitions.

Thus, the on-hook/off-hook status of a subscriber's line is detected by a circuit using a single light-emitting device 54 optically coupled to a single light-receiving device 60. Furthermore, neither device is connected directly in any manner which affects the transmission balance, in the subscriber's talking path, T and R leads, while the subscriber is off-hook.

While one specific embodiment of the invention has been described in detail above, it will be obvious that various modifications may be made from the specific details described without departing from the spirit and scope of the invention.

What is claimed is:

1. An on-hook/off-hook detection circuit for detecting the status of a subscriber's telephone set at all times even during ringing, which set is connected by a telephone line having at least two wires to a telephone switching system, comprising:
   a light-emitting device connected directly across the subscriber's telephone line;
   means for connecting the device with a current source so that, when the subscriber's telephone set is off-hook the light-emitting device is not emitting light, and when the subscriber's telephone set is on-hook the light-emitting device is emitting light; and
   photo-responsive means optically coupled to the light-emitting device and interconnected with the switching system for providing an indication of the on-hook/off-hook status of the subscriber's telephone set.

2. A detection circuit as recited in claim 1 wherein the circuit further comprises;
   a resistor, connected in series with the light-emitting device having a value substantially greater than the resistance value of the subscriber's telephone set to insure that the light-emitting device turns off when the subscriber goes off-hook.

3. A circuit for detecting current flow in a subscriber's telephone set between two leads of a talking path connected to the set, comprising:
   a light-emitting device;
   a current-limiting resistor connected in series with the light-emitting device, the resistor having a relatively high resistance compared to the off-hook resistance of the set;
   means for connecting the device and the current-limiting resistor directly between the two leads of the talking path in parallel with the subscriber's telephone set and for connecting the two leads of the talking path to a current source so that (1), when the subscriber's telephone set is off-hook, the device circuit is effectively shorted by current flowing through the set and insufficient current flows from the current source to the device to drive the device to emit light, and (2), when the subscriber's telephone set is on-hook, sufficient current flows from the source to the device to drive the device to emit light; and
   a photo-transistor responsive to light emitted from the light-emitting device for providing an indication of the current flow in the telephone set.

4. In combination with a telephone set and a circuit for detecting the on-hook/off-hook status of the set, of the type including tip and ring leads connected to the set, a line switch contact in the telephone set for connecting the tip and ring leads together to form a voice path when the contact is closed (off-hook state), a light emitting device connected in the circuit for indicating the on-hook/off-hook state by emitting light in one state and not in the other, a source of potential for operating the light-emitting device, and a circuit for sensing the state of the light-emitting device for controlling the operation of the set, an improved detection circuit wherein:
   the light-emitting device and a current-limiting resistor are serially connected directly between the tip and ring leads in a branch circuit path parallel with the voice path circuit and line switch contact of the telephone set, there being no switching device connected in the branch circuit path including the light-emitting device;
   the source of potential is connected to the tip and ring leads so that the light-emitting device is normally energized to emit light when the set is on-hook;
   the resistance of the branch path including the current-limiting resistor and the light-emitting device is sufficiently high with respect to the resistance of the set that when the line switch contact is closed the diode is effectively shorted out by the voice path circuit formed by the set in the off-hook state, so that the light-emitting device is turned off only in the off-hook state of the set; and
   the sensing circuit is arranged to detect the off state of the light-emitting device as the off-hook state of the set.

* * * * *